United States Patent [19]
Takahashi

[11] Patent Number: 5,463,510
[45] Date of Patent: Oct. 31, 1995

[54] DISK DRIVE SYSTEM HAVING COMBINED CLAMP/EJECT SWITCH

[75] Inventor: Kazushi Takahashi, Chichibu, Japan

[73] Assignee: Canon Denshi Kabushiki Kaisha, Saitama, Japan

[21] Appl. No.: 246,469

[22] Filed: May 18, 1994

Related U.S. Application Data

[63] Continuation of Ser. No. 642,514, Jan. 17, 1991, abandoned.

[30] Foreign Application Priority Data

Jan. 20, 1990 [JP] Japan ................................ 2-11030

[51] Int. Cl.⁶ .................................................. H03K 17/04
[52] U.S. Cl. ..................... 360/99.07; 360/99.06; 360/99.03
[58] Field of Search ................... 360/96.1, 96.2, 360/96.5, 99.02, 99.03, 99.06, 99.07

[56] References Cited

U.S. PATENT DOCUMENTS

| | | | |
|---|---|---|---|
| 4,040,107 | 8/1977 | Bryer | 360/99.03 |
| 4,670,802 | 6/1987 | Ogawa et al. | 360/97 |
| 4,716,477 | 12/1987 | Uehara | 360/99.07 |
| 4,736,357 | 4/1988 | Uehara et al. | 369/270 |
| 4,872,076 | 10/1989 | Uehara et al. | 360/99.07 |
| 4,879,616 | 11/1989 | And | 360/99.06 |
| 5,008,874 | 4/1991 | Uehara | 369/75.2 |

FOREIGN PATENT DOCUMENTS 0106061  6/1985  Japan ................. 360/99.07

*Primary Examiner*—Terry D. Cunningham
*Attorney, Agent, or Firm*—Spencer, Frank & Schneider; Christopher H. Lynt

[57] ABSTRACT

A disk drive system with a disk loading/ejection control mechanism, includes a disk insertion detection switch for detecting an insertion of a disk and a first cam member for controlling loading and ejection operations of the disk. The first cam member is rotated by a driver to perform loading and ejection of the disk. A loading/ejection position detection switch detects both loading and ejection positions of the disk. A second cam controls the loading/ejection position detection switch, the second cam being co-operatively operated with the first cam. A controller is responsive to the operation of the disk insertion detection switch to drive the driver, and is responsive to both the leading and trailing edges of an output from the loading/ejection position detection switch, for detecting the disk loading and ejection positions to control the driver.

13 Claims, 4 Drawing Sheets

DISK DRIVE SYSTEM HAVING COMBINED CLAMP/EJECT SWITCH

This application is a continuation of application Ser. No. 07/642,514, filed Jan. 17, 1991, now abandoned.

BACKGROUND OF THE INVENTION

1. Field of the Invention

The present invention relates generally to a disc drive system and more specifically to a disc drive system which has a disc loading/ejection control mechanism.

2. Description of the Prior Art

FIGS. 3A and 3B show a conventional floppy disc drive control system as an example of a disc drive system of this type. It will be noted that FIG. 3A illustrates the condition that a disk is loaded and clamped, while FIG. 3B shows the condition that the disk loaded is ejected from the drive.

In FIGS. 3A and 3B, reference numeral 1 denotes a main body of the disc drive. Reference numeral 2 denotes a known drive controller for controlling the loading and ejection of a floppy disc 11. Reference numeral 3 denotes a read/write head for writing or reading data into or from the floppy disc 11. Reference numeral 4 denotes a stepping motor for displacing the read/write head 3 radially forward and backward in the direction intersecting concentric tracks on the floppy disk 11. Reference numeral 5 denotes a spindle motor for rotating the floppy disk 11. Reference numeral 6 denotes a track 00 sensor for detecting the track 00 on the floppy disk from the position of the head 3; 7, a media-in switch for detecting the insertion/ejection of; and 8, a clamp-end switch for detecting the loading position of the floppy disk 11. In FIG. 3A, the switch 8 detects the loading position of the floppy disk 11. In FIG. 3B, the switch 8 detects that the floppy disk 11 is not at the loading position. Reference numeral 9 denotes an eject-end switch for detecting that the floppy disk 11 is ejected. In FIG. 3A, the switch 9 detects that the floppy disk 11 is not ejected. In FIG. 3B, the switch 9 detects the ejection of the floppy disk 11. Reference numeral 10 denotes an eject switch for instructing the drive controller 2 the start of an ejection operation. Reference numeral 12 denotes a clamp arm for clamping the floppy disk 11.

Reference numeral 13 denotes a clamp arm driving roller 13 which is disposed in engagement with the upper surface of the clamp arm 12 and arranged to drive the clamp arm 12 vertically. Reference numeral 14 denotes a roller disposed in contact with a cam 16 so as to be driven by the cam 16 and for driving a disc ejection lever 15 via a known mechanism by transmitting the force by the cam 16 as a disc loading/ejection drive force. The disc ejection lever 15 transmits the loading/ejection drive force to the roller 13 and also controls the ON/OFF switching of the clamp end switch 8 and the eject end switch 9.

The cam 16 is driven by a clamp/eject motor 17. In FIGS. 3A and 3B, arrows 18 and 19 respectively indicate forward and reverse rotational directions of the cam 16. When the cam 16 is rotated forward, the disk 11 is clamped. When the cam 16 is rotated reversely, the clamp is released and the disc 11 is ejected.

FIG. 4 is a timing chart illustrating one example of the operation of the disc loading/ejection control system shown in FIGS. 3A and 3B. In FIG. 4, "a" denotes a waiting or transient time of the switches 7–10. In other words, the switch outputs are stably obtained after the waiting time "a". "S", "F" and "R" denote the stop, the forward rotation and the reverse rotation of the motor 17, respectively. At instant To, the disk 11 is in an eject condition shown in FIG. 3B. At instant T1, the floppy disc 11 is inserted and the media-in switch 7 is switched to an ON state so that the disc loading operation is started. Instants T1, T5, T6 and T7 denote the change of the rotation of the cam 16 during the normal loading/ejection operation.

At instant T1, the cam 16 is rotated forward in the direction indicated by the arrow 18 to drive the roller 14, the lever 15 and the roller 13 so as to clamp the disc 11, thereby performing the disc loading. As a result, the eject end switch 9 is rendered from an ON state to an OFF state. At the instant T5, the clamp end switch 8 is rendered to an ON state and the cam 16 is stopped. As a result, the disc loading operation is completed, as shown in FIG. 3A.

Subsequently, at the instant T6, the eject switch 10 is rendered to an ON state and the eject motor 17 is rotated reversely, thereby performing operations in reverse of operations at the time of the disc loading. At instant T7, the eject end switch 9 is rendered to an ON state and the ejection operation is completed, as shown in FIG. 3B.

An operation at instants To', T1', T2, T3 and T4 shows that the floppy disc 11 is removed during the disc loading procedure.

At instant To', like instant To', the floppy disc 11 has been ejected. At instant T1', like instant T1, the floppy disc 11 is inserted. Then, the media-in switch 7 is rendered to an ON state and the disc loading operation is initiated. Subsequently, at instant T2, the floppy disc 11 is removed. Then, the media-in switch 7 is rendered to an OFF state. It will also be noted that at instant T2 the eject end switch 9 is interrupted.

Further, at this instant T2, the clamp/eject motor 17 is stopped, so that the forward rotation of the cam 16 in the direction indicated by arrow 18 is stopped. Following the expiration of a time duration defined between instants T2 and T3, the motor 17 rotates in the reverse direction at instant T3 to rotate the cam 16 backward. At instant T4, the eject end switch 9 is rendered to an ON state and the motor 17 stops. Accordingly, the cam 16 also stops, as shown in FIG. 3B.

However, with the above-described conventional arrangement, it is necessary to provide both the clamp end switch 8 and the eject end switch 9 as means for detecting both the clamp and ejection of the floppy disc. Accordingly, this arrangement of course increases the total number of switches required and thus increases the number of parts and assembly works and the total cost of the system.

SUMMARY OF THE INVENTION

It is, therefore, an object of the present invention to provide a disc drive system in which a loading/ejection control arrangement is improved to overcome the above-mentioned drawbacks.

It is a second object of the present invention to provide a disc drive system having a loading/ejection control arrangement which requires only one switch which detects both the disc clamp and the disc ejection.

It is a third object of the present invention to provide a disc drive system having a loading/ejection control arrangement in which a position of a switch for detecting the loading and ejection of a disc is easily adjusted or the switch requires no adjustment.

In order to achieve the above object, according to the present invention, there is provided a disc drive system with a disc loading/ejection control mechanism comprising:

- a disc insertion detection switch for detecting an insertion of a disc;
- a first cam member for controlling loading and ejection operations of the disc;
- drive means for driving to rotate the first cam member to perform the loading and ejection of the disc;
- a loading/ejection position detection switch for detecting both loading and ejection positions of the disc;
- a second cam for controlling the loading/ejection position detection switch, the second cam being co-operatively operated with the first cam; and
- means responsive to both the leading and trailing edges of the output from the loading/ejection switch, for detecting the disc loading and ejection positions to control the drive means.

Here, the disc drive system may further comprises:

An arm for operatively coupling the second cam to the loading/ejection position detection switch.

The first cam may be coupled to a first clamp lever by a first roller which contacts the first cam, and engaged by a second roller, the first clamp lever may be coupled to a second clamp lever by a second roller so that the second clamp lever clamps the disc.

The loading/ejection position detection switch may comprise a non-contact switch.

The non-contact switch may comprise a photo interrupter.

The non-contact switch may comprise a photo coupler.

The disc may be a recording medium disc.

An output from the loading/ejection position detection switch drives the drive means either in a loading or ejection direction.

The drive means may comprise an electric motor, the forward or reverse rotation of which may control the loading or ejection of the disc.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

Figure 1A:
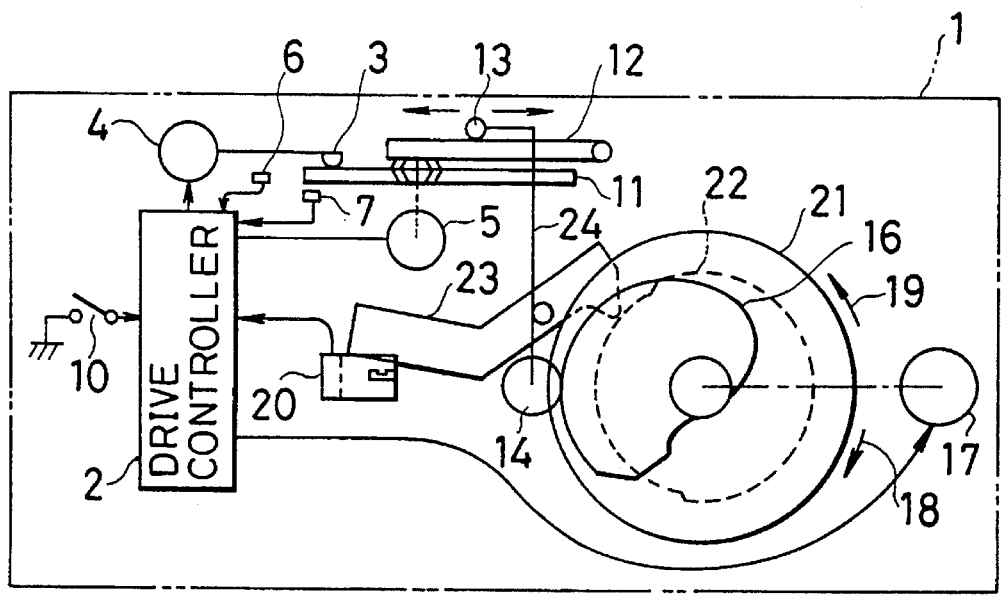
FIGS. 1A and 1B are schematic diagrams showing a disc loading condition and a disc ejection condition in an embodiment of a disc drive system having a loading/ejection control arrangement according to the present invention, respectively.
Figure 1B:
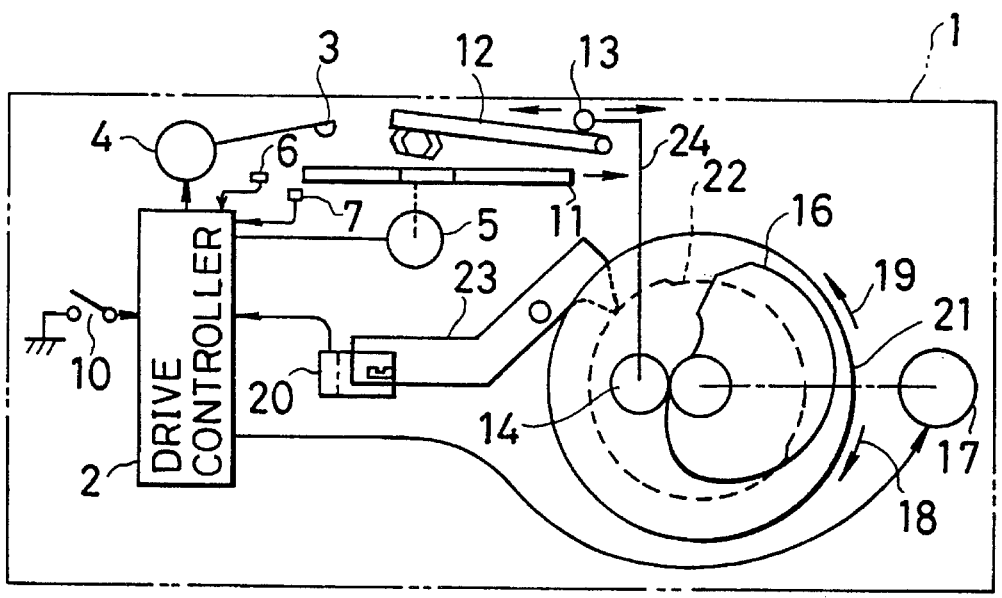
Figure 3A:
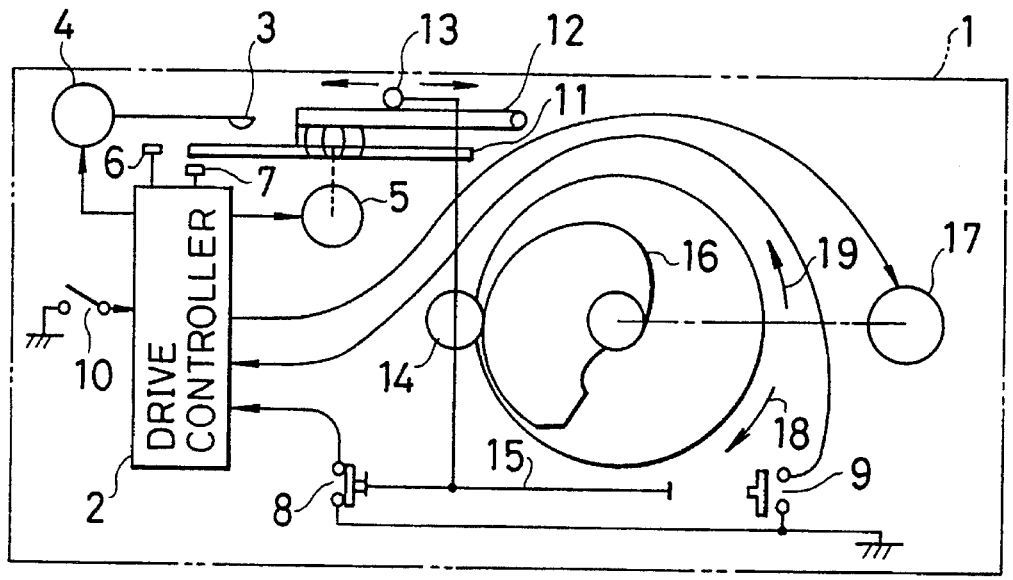
FIGS. 3A and 3B are schematic diagrams showing a disc loading condition and a disc ejection condition in an example of a prior art arrangement.
Figure 3B:
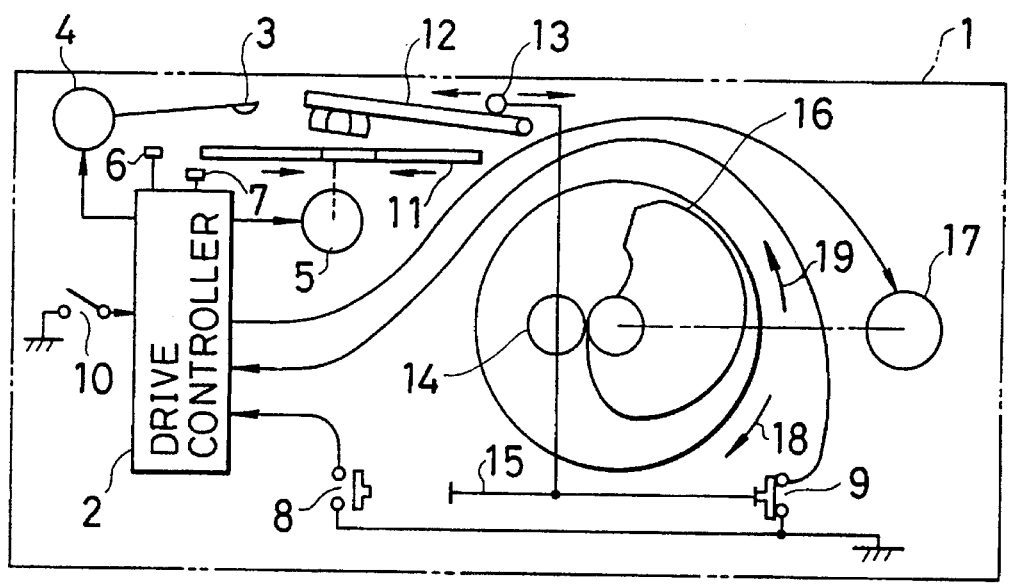

FIGS. 1A and 1B show an embodiment of a disc drive system having a disc loading/ejection control arrangement according to the present invention. FIGS. 3A and 3B correspond to a condition that a disc is loaded and a condition that a disc is ejected from the disc drive by a certain amount so that the disc is removable, respectively. In FIGS. 1A and 1B, the same reference numerals are used to designate corresponding parts shown in FIGS. 3A and 3B.

In FIGS. 1A and 1B, reference numeral 20 denotes a clamp/eject switch in the form of non-contact switch, for instance, a photo interrupter or a photo coupler having a light emitting device and a light receiving device. In FIG. 1A, an output of the switch 20 is at a low level, while in FIG. 1B, an output of the switch 20 is at a high level. Reference numeral 21 denotes a cam base on which the cam 16 is formed. Reference numeral 22 denotes a cam for controlling the clamp/eject switch 20. The cam 22 is provided on the surface of the base 21 on the side opposite the surface on which the cam 16 is arranged. An arm 23 for controlling ON/OFF of the clamp/eject switch 20 is provided in such a way that the arm 23 contacts the cam 22 so that the arm 23 follows the rotation of the cam 22 to actuate the switch 20.

A clamp lever 24 interconnects rollers 13 and 14 in a manner to transmit the clamp/eject drive force which is applied to roller 14 by the cam 16 to the roller 13. The clamp lever 24 also serves to eject a disc by operating a conventional mechanism for the ejection (not shown) when a disc ejection is instructed. In the prior art example shown in FIGS. 3A and 3B, the roller 14 is coupled to the clamp lever 15, whereas the present embodiment is different from the prior art example in that the roller 14 is coupled to the clamp lever 24 for controlling the disc clamp and ejection operations.

Figure 2:
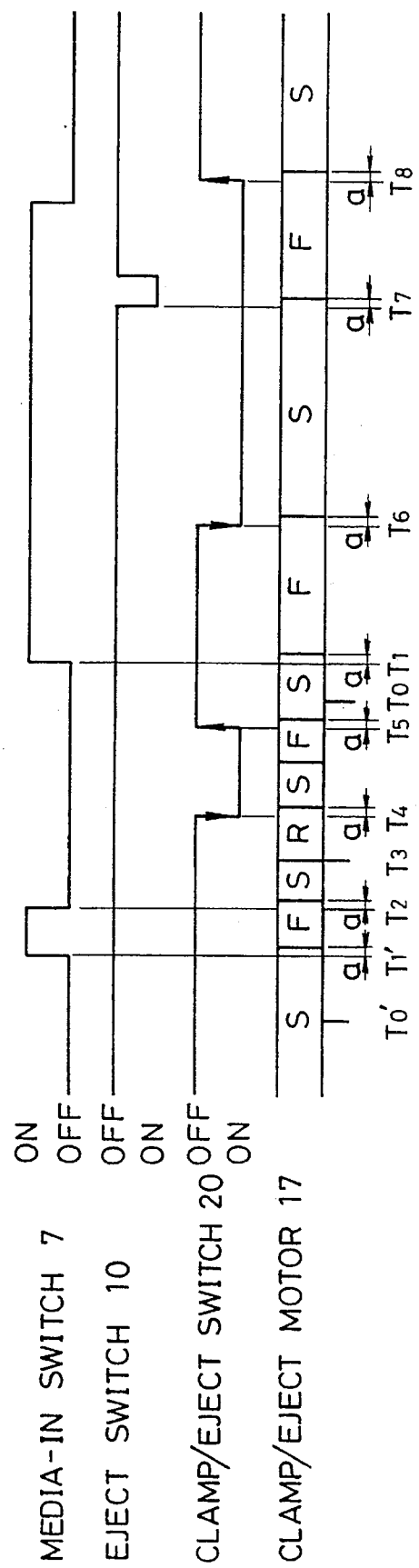
FIG. 2 is a timing chart illustrating operations of the embodiment of the present invention shown in FIGS. 1A and 1B.
Figure 4:
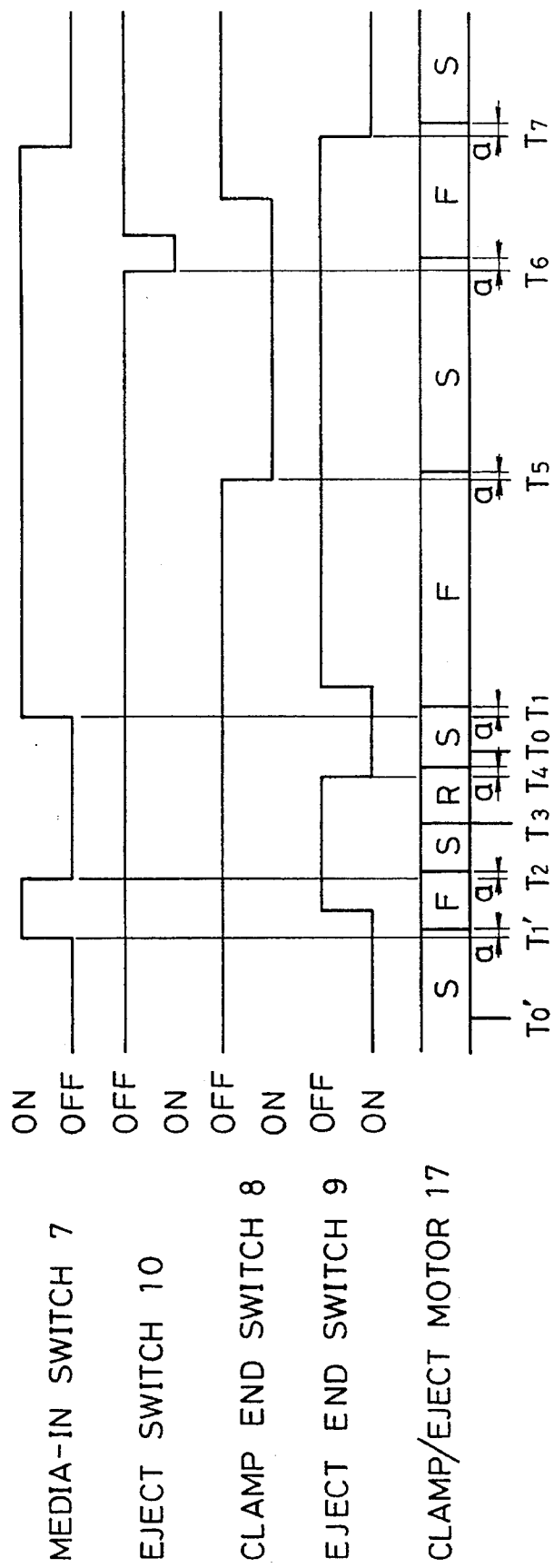
FIG. 4 is a timing chart illustrating operations of the conventional arrangement shown in FIGS. 3A and 3B.

FIG. 2 is a timing chart illustrating one example of operations of the arrangement shown in FIGS. 1A and 1B. As in the case of the timing chart illustrated in FIG. 4, "a" also indicates a time duration required to obtain a stable sensor output after switching. For example, the switches are formed by an optical sensor, "a" means a waiting time required for a stable sensor output. "S", "F" and "R" denote the stop, the forward rotation and the reverse rotation of the motor 17, respectively. At instants To and To', the disk 11 is ejected. At instants T1 and T1', the disc 11 is inserted so that the media-in switch 7 is rendered to an ON state. In other words, instants T1 and T1' indicate a starting point of the disc loading operation in FIG. 1A. In FIG. 2, a sequence of operations of normal disc loading and ejection is illustrated at instants T1, T6, T7 and T8. When the disc 11 is inserted at instant T1, the motor 17 is driven to rotate the cam 16 forwardly, so that the disc loading operation is initiated. At instant T6, the clamp/eject switch 20 is actuated. The trailing edge of the output from the switch 20 detects that the disc loading is completed and the loading operation is terminated. When the eject switch 10 is rendered to an ON state, the cam 16 is rotated reversely at instant T7 to start the disc ejection operation. At instant T8, the arm 23 is rotated by the switch cam 22, so that the leading edge of the output from the clamp/eject switch 20 detects that the disc 11 is ejected. In response to this detection, the operation of the clamp/eject motor 17 is stopped and accordingly the ejection operation is terminated.

The sequence of operations at instants T1', T2, T3, T4 and T5 shows that the disk 11 is manually removed during the disc loading operation after the disc loading operation is started at instant T1' and the motor 17 is rotated forwardly. When the media-in switch 7 is rendered to an OFF state at instant T2, the forward rotation of the clamp/eject motor 17 is stopped. At instant T3, the motor 17 rotates reversely. At instant T4, the trailing edge of the output from the clamp/eject switch 20 detects an ejection position of the disc 11 and the reverse rotation of the motor 17 is stopped.

After the lapse of the period of time that the motor is stopped, the motor 17 rotates forwardly again and at instant T5, the leading edge of the output from the clamp/eject switch 20 detects that the clamp/eject switch cam 22 has assumed the position illustrated in FIG. 1A, so that the forward rotation of the motor 17 is stopped.

According to the present invention, a single clamp/eject switch 20 is sufficient for both the disc clamping and ejection and the leading and trailing edges of the output from the switch 20 can control both the disc loading and disc ejection operations.

Further, while the above-described embodiment relates to a disc loading/ejection control system for a floppy disc drive, it will be understood that the present invention is not limited to the embodiment, but can be applied to a disc loading/ejection control system for various types of recording medium such as optical discs, opto-magnetic discs, video discs or the like.

It will also be appreciated that the loading/eject switch is not limited to the above-mentioned photo coupler or photo interrupter types and can take the form of a suitable contact type switch.

According to the present invention, a single switch can detect the two positions, i.e., the disc loading and ejection positions by the leading and trailing edges of the output from the single switch, which is controlled by the clamp/eject switch cam. As a consequence, the number of adjusting steps when a disc drive unit is manufactured is decreased. Alternatively, by determining the shape of the clamp/eject switch cam suitably, it is possible to omit the position adjustment of the clamp/eject switch.

Thus, the present invention enables both a decrease in cost and the number of parts along with improved motor control.

The invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A disk drive system with a disk loading/ejection control mechanism, comprising:

a disk insertion detection switch for detecting an insertion of a disk;

a first cam member for controlling a disk loading mechanism for loading and ejection operations of said disk when it is inserted;

drive means for driving to rotate said first cam member to cause said disk loading mechanism to perform the loading and ejection of said disk;

a loading/ejection position detection switch for detecting both loading and ejection positions of said disk, said loading/ejection position detection switch having a movable member;

a second cam member for controlling a movement of said movable member of said loading/ejection position detection switch, said second cam member being co-operatively operated with said first cam member; and control means, responsive to an output of said disk insertion detection switch to drive said drive means, and responsive to both the leading and trailing edges of an output from said loading/ejection position detection switch on the basis of rotation of said second cam member, for detecting the disk loading and ejection positions on the basis of said leading or trailing edges to control said drive means, the output being generated in accordance with the movement of said movable member, the leading edge corresponding to the movement of said movable member in one direction, and the trailing edge corresponding to the movement of said movable member in another direction.

2. A disk drive system as claimed in claim 1, further comprising:

an arm for operatively coupling said second cam member to said loading/ejection position detection switch.

3. A disk drive system as claimed in claim 1, wherein said first cam member is coupled to a first clamp lever by a first roller which contacts said first cam member, and engaged by a second roller, said first clamp lever is coupled to a second clamp lever by the second roller so that said second clamp lever clamps said disk.

4. A disk drive system as claimed in claim 1, wherein said loading/ejection position detection switch comprises a non-contact switch.

5. A disk drive system as claimed in claim 4, wherein said non-contact switch comprises a photo interrupter.

6. A disk drive system as claimed in claim 4, wherein said non-contact switch comprises a photo coupler.

7. A disk drive system as claimed in claim 1, wherein said disk is a recording medium disk.

8. A disk drive system as claimed in claim 1, wherein said drive means is driven either in a loading or ejection direction by said control means based on the output from said loading/ejection position detection switch.

9. A disk drive system as claimed in claim 1, wherein said drive means comprises an electric motor, the forward or reverse rotation of which controls the loading or ejection of said disk.

10. A recording and reproducing apparatus for loading and ejection operations of a recording medium, comprising:

an insertion detection switch for detecting an insertion of said recording medium into said apparatus;

a loading and ejection mechanism for performing the loading and ejection of said recording medium, said loading and ejection mechanism having a cam means for controlling the loading and ejection operations;

a motor for driving said loading and ejection mechanism by driving said cam means;

a loading/ejection position detection switch for detecting both of a loading position and an ejecting position of said loading and ejection mechanism by detecting driving positions of said cam means, said loading/ejection, position detection switch having a movable member for detecting an operation of said cam means; and control means, responsive to an output of said insertion detection switch, for driving said motor for driving said loading and ejection mechanism to perform a loading of said recording medium, said control means also responsive to both of the leading and trailing edges of an output from said loading/ejection position detection switch on the basis of operation of said cam means, for detecting whether the loading or the ejecting operation of said recording medium has been performed by said loading and ejection mechanism and said motor according to a detection of the leading or trailing edges, said output being generated in accordance with a movement of said movable member, the leading edge corresponding to the movement of said movable member in one direction, and the trailing edge corresponding to the movement of said movable member in another direction.

11. A recording and reproducing apparatus as claimed in claim 10, wherein said cam means comprises a first cam for controlling the loading and ejection operations of said recording medium and a second cam for operating said loading/ejection position detection switch.

12. A recording and reproducing apparatus as claimed in claim 11, wherein said control means allows said motor to rotate in a direction at the loading time and to rotate in the same direction at the ejection time.

13. A recording and reproducing apparatus as claimed in claim 10, wherein said loading/ejection position detection switch comprises a non-contact switch.

* * * * *